United States Patent
Woo

(10) Patent No.: US 11,944,085 B2
(45) Date of Patent: Apr. 2, 2024

(54) INSECT REPELLING SYSTEM USING VEHICLE

(71) Applicants: Hyundai Motor Company, Seoul (KR); Kia Corporation, Seoul (KR)

(72) Inventor: Dong Hyeon Woo, Daegu (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 273 days.

(21) Appl. No.: 17/519,880

(22) Filed: Nov. 5, 2021

(65) Prior Publication Data

US 2022/0378036 A1 Dec. 1, 2022

(30) Foreign Application Priority Data

May 26, 2021 (KR) .......... 10-2021-0067335

(51) Int. Cl.
*A01M 29/16* (2011.01)
*B60Q 1/24* (2006.01)

(52) U.S. Cl.
CPC .......... *A01M 29/16* (2013.01); *B60Q 1/247* (2022.05); *H04R 2499/13* (2013.01)

(58) Field of Classification Search
CPC ...... A01M 29/00; A01M 29/06; A01M 29/08; A01M 29/10; A01M 29/16; A01M 29/18; A01M 29/22
USPC .......... 43/132.1; 116/22 A; 367/139
See application file for complete search history.

(56) References Cited

U.S. PATENT DOCUMENTS

| | | | | |
|---|---|---|---|---|
| 10,306,880 | B2* | 6/2019 | Teh .......... | A01M 29/18 |
| 11,653,642 | B2* | 5/2023 | Salter .......... | G06V 20/56 |
| | | | | 367/139 |
| 2006/0233049 | A1* | 10/2006 | Cilliers .......... | A01M 29/18 |
| | | | | 367/139 |
| 2015/0084751 | A1* | 3/2015 | Crawford .......... | A01M 29/18 |
| | | | | 340/384.2 |

FOREIGN PATENT DOCUMENTS

| | | | | |
|---|---|---|---|---|
| CN | 110896944 | A | * 3/2020 | .......... A01M 29/18 |
| JP | 2010281763 | A | * 12/2010 | |
| JP | 2018042512 | A | * 3/2018 | |
| KR | 20060065268 | A | * 6/2006 | |
| KR | 2015-0057446 | A | 5/2015 | |
| KR | 2015-0059379 | A | 6/2015 | |
| KR | 2015-0141346 | A | 12/2015 | |

* cited by examiner

*Primary Examiner* — Peter M Poon
*Assistant Examiner* — Hae Rie Jessica Byun
(74) *Attorney, Agent, or Firm* — Fox Rothschild LLP

(57) ABSTRACT

An insect repelling system utilizes a vehicle, and includes: a position information acquisition unit configured to acquire and provide vehicle position information, an interface unit configured to display species-based frequency ranges that insects avoid and to allow a user to select one of the displayed frequency ranges, a controller configured to perform control such that the interface unit displays the species-based frequency ranges that are avoided by insects that can be repelled at the current position of the vehicle based on the vehicle position information acquired by the position information acquisition unit and to generate and output a control signal for outputting a sound having the frequency selected through the interface unit, and a sound generation device configured to output the sound having the frequency by the user according to the control signal output by the controller.

14 Claims, 4 Drawing Sheets

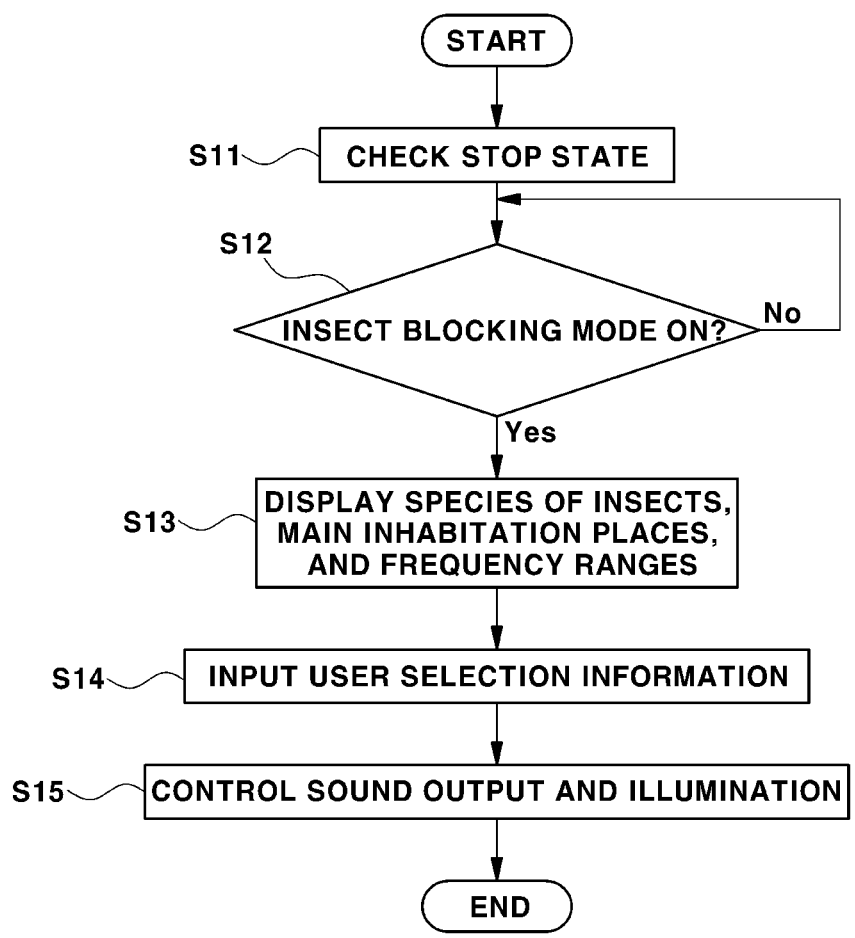

INSECT REPELLING SYSTEM USING VEHICLE

CROSS-REFERENCE TO RELATED APPLICATION

This application claims under 35 U.S.C. § 119(a) the benefit of Korean Patent Application No. 10-2021-0067335 filed on May 26, 2021, the entire contents of which are incorporated herein by reference.

BACKGROUND

(a) Technical Field

The present disclosure relates to an insect repelling system, more particularly, to a system capable of effectively repelling insects that gather around a vehicle using the vehicle during night or outdoor activities, such as camping.

(b) Background Art

In recent years, more people have incorporated vehicles into camping trips, for example, car camping using a vehicle to simply transport camping supplies or as a portion of the structure necessary to install a tent, and camping using the vehicle itself, such as a vehicle modified for lodging or a camper van, i.e., a dedicated vehicle. Furthermore, in recent years, more vehicles have been manufactured with the specific purpose of being used for camping or to permit sleeping within the vehicle.

For some, the purpose of camping is to enjoy rest in nature, and therefore environments in which people can experience nature and also board and lodge are important in camping. For these reasons, various camping supplies and equipment that enable safe and comfortable camping have been used.

Since people camp outdoors, not indoors, and during the night as well as during the day, there are several difficulties, one of which is related to harmful insects, such as mosquitoes, flies, and moths.

Injuries and disease that may be transmitted by such harmful insects are well known. For example, insects, such as mosquitoes or moths, typically gather at an illuminated place at night, whereby people may feel discomfort and inconvenience. In addition, harmful insects may cause diseases, such as skin itching, and may carry contagious diseases.

In particular, mosquitoes are known as harmful insects that disturb sleep or restrict outdoor activities, since the mosquitoes consume blood of people or animals, and may cause fatal diseases, such as malaria, encephalitis, yellow fever, and dengue fever.

For example, it is known that about 53 species of mosquitoes inhabit Korea. Thereamong, *Anopheles sinensis* carries malaria and inland brugian filariasis, and *Aedes togoi* carries filariasis in islands in the South Sea of Korea. *Culex tritaeniorhynchus*, which is known as an encephalitis-bearing mosquito, carries Japanese encephalitis, and *Culex pipiens pallens* and *Culex pipiens molestus*, which belong to *Culex*, may harm people in cities by bloodsucking.

Various plans have been proposed in order to prevent injuries due to harmful insects. As an example, a spray type insect repellant may be used. In addition, chemical control using insecticides is mainly performed in order to control harmful insects, such as mosquitoes. However, these synthetic chemical insecticides may cause side effects, such as development of chemical resistance, toxicity to humans and animals, and environmental pollution.

Additionally, a mosquito collector that entices and collects mosquitoes using light or incenses that the mosquitoes like or an insect collector may be used. Since the mosquito collector entices mosquitoes, however, a larger number of mosquitoes may gather to injure people in the case in which the mosquito collector is installed in a space in which people are active.

The above information disclosed in this Background section is provided only for enhancement of understanding of the background of the disclosure and therefore it may contain information that does not form the prior art that is already known in this country to a person of ordinary skill in the art.

SUMMARY

It is an object of the present disclosure to provide a system that is capable of safely repelling insects, such as mosquitoes or moths, without using a chemical having side effects, such as a chemical insecticide, and which is capable of more effectively repelling insects using a vehicle during night or outdoor activities, such as camping.

The objects of the present disclosure are not limited to those described above, and other unmentioned objects of the present disclosure will be clearly understood by a person of ordinary skill in the art (hereinafter referred to as an "ordinary skilled person") from the following description.

In order to accomplish the object, in an aspect, the present disclosure provides an insect repelling system using a vehicle, the insect repelling system including a position information acquisition unit configured to acquire and provide vehicle position information, an interface unit configured to display species-based frequency ranges that insects avoid and to allow a user to select one of the displayed frequency ranges, a controller configured to perform control such that the interface unit displays species-based frequency ranges that are avoided by insects that can be repelled at the current position of the vehicle based on the vehicle position information acquired by the position information acquisition unit and to generate and output a control signal for outputting a sound having the frequency selected through the interface unit, and a sound generation device configured to output the sound having the frequency by the user according to the control signal output by the controller.

The insect repelling system may further include an illumination device configured to illuminate a region selected by the user, which is a portion of a space around the vehicle, according to the control signal output by the controller in order to entice insects.

The space around the vehicle may include front, rear, left, and right regions around the vehicle, and the illumination device may include lamps mounted to the vehicle to selectively emit light to the front, rear, left, and right regions.

The interface unit may be configured to display a plurality of regions defined by partitioning the space around the vehicle and to allow the user to select one of the plurality of displayed regions as an insect blocking region, and the controller may generate and output a control signal for outputting the sound having the selected frequency to the insect blocking region selected through the interface unit.

The insect repelling system may further include an illumination device configured to illuminate another region selected by the user, among the plurality of regions, according to the control signal output by the controller in order to entice insects.

The plurality of regions may include front, rear, left, and right regions around the vehicle, and the illumination device may include lamps mounted to the vehicle so as to selectively emit light to the front, rear, left, and right regions.

The controller may set the other selected region illuminated by the illumination device as a region opposite the insect blocking region selected by the user among the plurality of regions displayed in the interface unit. The sound generation device may include speakers mounted to the vehicle so as to output sounds to the plurality of regions defined by partitioning the space around the vehicle.

The sound generation device may be a virtual engine sound system, and the speakers may be speakers of the virtual engine sound system.

The plurality of regions may include front, rear, left, and right regions around the vehicle, and the sound generation device may include speakers mounted to the vehicle so as to selectively output sounds to the front, rear, left, and right regions.

The interface unit may be configured to further display information about species-based main inhabitation places of insects to allow the user to select an insect and a frequency range set for a main inhabitation place corresponding to a place at which the user is located.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 5 is a flowchart showing an operation process of the insect repelling system according to the embodiment of the present disclosure.

Figure 1:
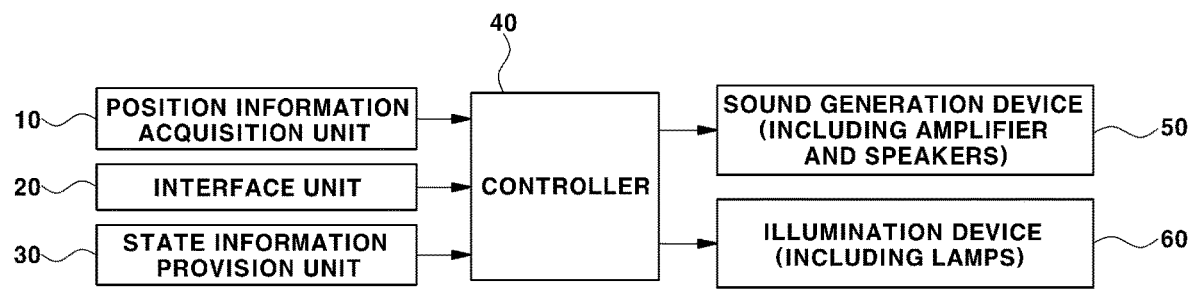
FIG. 1 is a block diagram showing the construction of an insect repelling system according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural or functional descriptions of the embodiments of the present disclosure disclosed in this specification are given only to illustrate embodiments of the present disclosure. Embodiments of the present disclosure may be realized in various forms. In addition, the embodiments according to the concept of the present disclosure are not limited to such specific embodiments, and it should be understood that the present disclosure includes all alterations, equivalents, and substitutes that fall within the idea and technical scope of the present disclosure.

It will be understood that, although the terms "first", "second", etc. may be used herein to describe various elements, corresponding elements should not be understood as being limited by these terms, which are used only to distinguish one element from another. For example, within the scope defined by the present disclosure, a first element may be referred to as a second element, and similarly, a second element may be referred to as a first element.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", must be interpreted in the same manner.

Wherever possible, the same reference numbers will be used throughout the drawings to refer to the same or like parts. The terms used in this specification are provided only to explain specific embodiments, but are not intended to restrict the present disclosure. A singular representation may include a plural representation unless it represents a definitely different meaning from the context.

The present disclosure provides a system capable of safely repelling insects, such as mosquitoes or moths, without using a chemical having side effects, such as a chemical insecticide. In particular, the present disclosure provides a system that enables a user to more effectively repel insects using his or her own vehicle during night or outdoor activities, such as camping.

An insect repelling system according to the present disclosure is provided at a vehicle, wherein insects may be repelled at a desired place using devices provided at the vehicle, and insects may be prevented from gathering at a place at which there are people.

To this end, in the insect repelling system according to the present disclosure, speakers 52 to 55 and lamps mounted to the vehicle are used, wherein sound having a frequency that insects avoid is output through the speakers 52 to 55, and a specific place at which there are no people is illuminated using the lamps such that insects gather at the place.

In addition, the insect repelling system according to the present disclosure may be applied to an electrified vehicle. Specifically, the insect repelling system may be applied to an electrified vehicle having a virtual engine sound system (VESS).

The virtual engine sound system (VESS) is provided at a vehicle having no engine and a driving mode using no engine, such as an electric vehicle (FCEV or BEV) or a hybrid vehicle (HEV or PHEV). A vehicle outputs a virtual engine sound such that a pedestrian can recognize a vehicle driving in the vicinity of the pedestrian.

In the insect repelling system according to the present disclosure, speakers 52 to 55 of the virtual engine sound system (VESS) are used to output sound for insect repelling and blocking.

Hereinafter, an embodiment of the present disclosure will be described with reference to the accompanying drawings.

Figure 2:
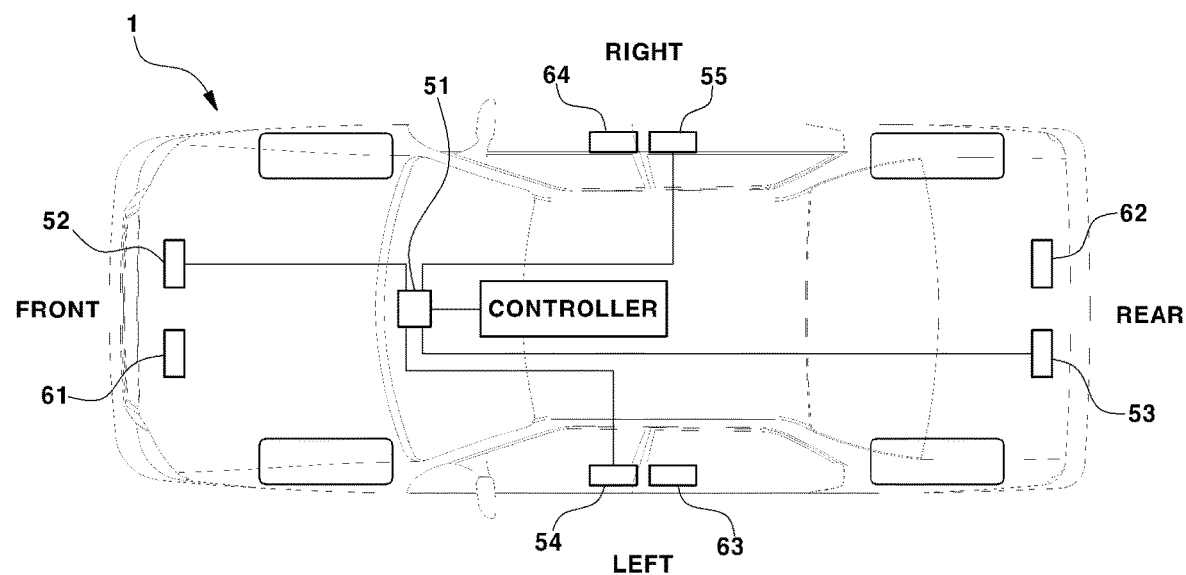
FIG. 2 is a view showing the state in which main components of the insect repelling system according to the embodiment of the present disclosure are provided at a vehicle.

FIG. 1 is a block diagram showing the construction of an insect repelling system according to an embodiment of the present disclosure, and FIG. 2 is a view showing the state in which main components of the insect repelling system according to the embodiment of the present disclosure are provided at a vehicle.

As shown in FIG. 1, the insect repelling system according to the embodiment of the present disclosure includes a position information acquisition unit 10 configured to acquire and provide vehicle position information, an interface unit 20 configured to allow a user to input user selection information, and a state information provision unit 30 configured to provide vehicle state information.

In addition, the insect repelling system according to the embodiment of the present disclosure includes a controller 40 configured to output a control signal for controlling insect repelling sound output and insect enticement light based on the vehicle position information, the vehicle state information, and the user selection information, a sound generation device 50 configured to output insect repelling sound according to the control signal output by the controller 40, and an illumination device 60 configured to illuminate a place selected by the user to entice insects according to the control signal output by the controller 40.

All of the components of the insect repelling system may be mounted to the vehicle. As will be described below, the user selection information is information input as the result of the user manipulating the interface unit 20 in order to select an insect repelling frequency (sound) and an insect blocking region.

The insect repelling system generates and outputs sound having a frequency that insects avoid through the sound generation device 50 such that a place around the vehicle at which a driver or people who camp together with the driver (hereinafter referred to as "users") are located and illuminates a specific place at which there are no people to entice insects through the illumination device 60.

The position information acquisition unit 10, which is a component configured to acquire current position information of the vehicle and to transmit the acquired information to the controller 40, may be a navigation system configured to acquire current position information of the vehicle and to transmit the acquired information to the controller 40 or a separate GPS receiver configured to receive a GPS signal indicating the current position of the vehicle and to transmit the received GPS signal to the controller 40.

The interface unit 20 of the insect repelling system is used for the user to select an insect repelling frequency (sound) and an insect blocking region. In the present disclosure, space around the vehicle is partitioned in advance into a plurality of regions depending on the positions of the speakers 52 to 55 and the lamps 61 to 64 mounted to the vehicle. The user selects an insect blocking region, to which an insect repelling frequency (sound) will be output, and an illumination region, to which insect enticement light will be emitted, from among the plurality of partitioned regions through the interface unit 20.

In the present disclosure, any device that can be manipulated by the user in order to select the frequency (sound) and the insect blocking region may be used as the interface unit 20. For example, a manipulation device provided at the vehicle, such as a button or a switch, or an input device or a touchscreen of an audio, video, and navigation (AVN) system may be used.

In the case in which the touchscreen is adopted, the interface unit 20 may include a display configured to display selectable frequencies and insect blocking regions and a sensing unit disposed on the surface of the display to sense user touch and to transmit a sensing signal to the controller 40.

In the insect repelling system according to the embodiment of the present disclosure, the interface unit 20 is connected to the controller 40. When the user manipulates the interface unit 20, therefore, user selection information based on manipulation of the interface unit 20 may be input to the controller 40.

As another example, in the case in which the interface unit 20 is a device mounted to the vehicle, the user may perform insect repelling manipulation through a mobile device, such as a mobile phone, or a remote control. That is, the interface unit 20 may include a mobile device or a remote control of the user. In this case, the mobile device and the remote control must be connected to the controller 40 so as to communicate therewith. To this end, an input and output communication interface for wireless connection between the mobile device or the remote control and the controller 40 is used.

In the insect repelling system according to the embodiment of the present disclosure, the controller 40 acquires information about insects that inhabit the current position of the vehicle acquired by the position information acquisition unit 10 and that can be repelled using sound based on pre-stored internal data, and at the same time acquires frequency information suitable for insect repelling and displays the acquired insect information and frequency information through the display of the interface unit 20.

In the insect repelling system according to the embodiment of the present disclosure, when the insect information and the frequency information are displayed through the display of the interface unit 20, the user may manipulate the interface unit 20 to select the species of an insect to be repelled (blocked) and a frequency range suitable for the selected insect from among the displayed information. The controller 40 performs control such that the sound generation device 50 outputs sound having the frequency range selected by the user based on the user selection information input through the interface unit 20.

Figure 3:
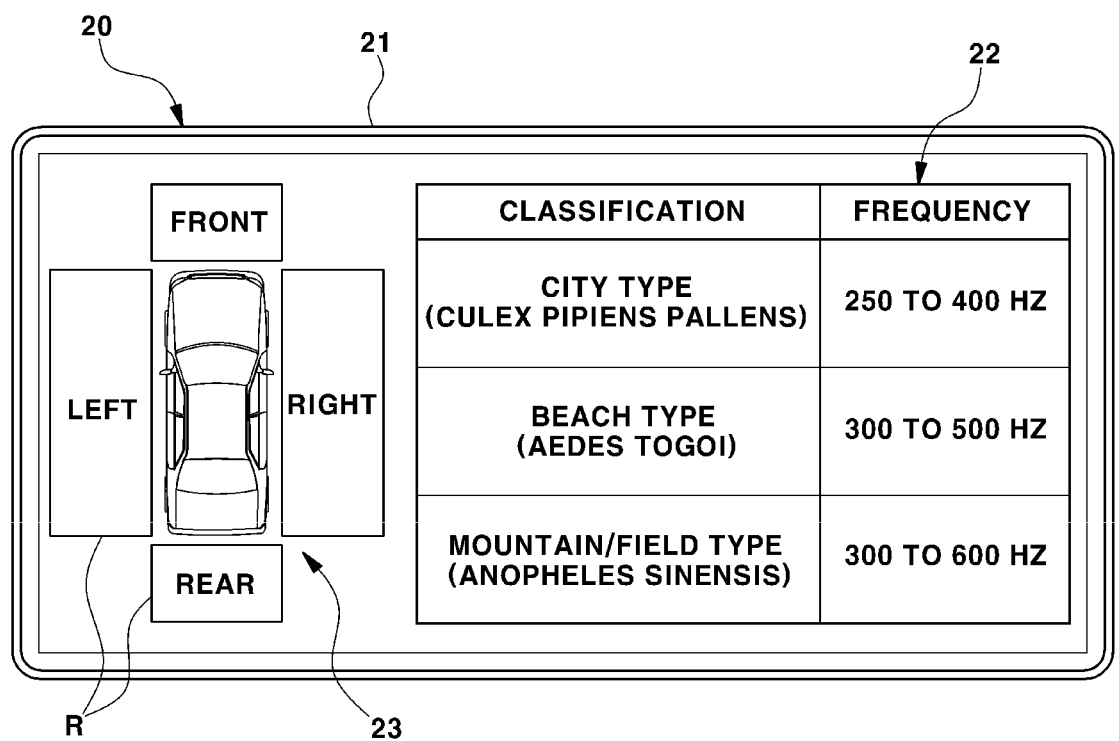
FIG. 3 is a view exemplarily showing a display screen configured to allow a user to select an insect repelling frequency and an insect blocking region in the insect repelling system according to the embodiment of the present disclosure.

FIG. 3 is a view exemplarily showing an example of a display screen (user setting screen) configured to allow a user to select an insect repelling frequency and an insect blocking region in the insect repelling system according to the embodiment of the present disclosure. As shown in FIG. 3, the display 21 of the interface unit 20 may provide a user setting screen, and the user setting screen may include a frequency selection unit 22 and a blocking region selection unit 23.

In the frequency selection unit 22, a plurality of selection buttons showing the species of insects (e.g., mosquitoes) that inhibit the current position of the vehicle and can be repelled using sound and frequency ranges of output sound may be displayed through the display 21 so as to be provided to the user.

Referring to FIG. 3, the species of mosquitoes that mainly inhibit the current position of the vehicle and can be repelled using sound having a set frequency and frequency ranges within which the mosquitoes avoid based on the species thereof are displayed. When the user manipulates the frequency selection unit 22 of the interface unit 20 to select one from among the displayed species of mosquitoes and frequency ranges, sound having a frequency that the selected mosquito avoids is generated and output by the sound generation device 50.

In the insect repelling system according to the embodiment of the present disclosure, as described above, the frequency and sound desired by the user may be selected as the result of the user manipulating the interface unit 20.

In the present disclosure, insects to be repelled are not limited to mosquitoes. In addition to mosquitoes, any insects (harmful insects) that can be repelled when sound having a specific frequency is output through the speakers 52 to 55 may be repelled. In addition, two or more species of mosquitoes or insects may be repelled depending on the frequency of the output sound.

For mosquitoes, frequency ranges that mosquitoes mainly inhabiting the region at which the vehicle is currently located avoid may be selected, as shown in FIG. 3, in consideration of the fact that frequencies that *Anopheles sinensis*, *Aedes togoi*, and *Culex pipiens pallens* avoid are different from each other.

Referring to FIG. 3, frequency ranges of an output sound and main inhabitation places are displayed for *Anopheles sinensis*, *Aedes togoi*, and *Culex pipiens pallens*. In FIG. 3, inhabitation places (city, beach, and mountain/field), frequency ranges, and species of mosquitoes designated for the inhabitation places and the frequency ranges are displayed. Table 1 below shows an example of species of mosquitoes, main inhabitation places, and avoided frequency ranges.

TABLE 1

| Classification | City type (*Culex pipiens pallens*) | Beach type (*Aedes togoi*) | Mountain/field type (*Anopheles sinensis*) |
|---|---|---|---|
| Frequency | 250 to 400 Hz | 300 to 500 Hz | 300 to 600 Hz |

As shown in Table 1, frequency ranges are set for main inhabitation places and species of mosquitoes (insects). Here, the frequency ranges are frequency ranges of sound that different species of mosquitoes avoid. Information about the main inhabitation places, the species of insects, and the avoided frequencies shown in Table 1 may be some of internal data pre-stored in the controller 40. The main inhabitation places and the frequencies of the output sound are differently set depending on the species of insects and displayed so as to be selected by the user.

The user may check the region at which the vehicle is currently located and may select one from among "city type," "beach type," and "mountain/field type" through the interface unit 20 (touchscreen). For example, in the case in which the interface unit 20 is a touchscreen, the user may touch a desired portion of the frequency selection unit 22 on the screen of the display 221 to select a species of mosquito and a frequency range (output sound).

In addition, as will be described below, the controller 40 performs control such that the sound generation device 50 outputs sound corresponding to one that the user selects through the interface unit 20. At this time, sound having the frequency range selected by the user is output from the sound generation device 50 in order to repel the selected species of mosquito.

The user may select an insect blocking region R through the blocking region selection unit 23 displayed on the screen of the display 21. The insect blocking region R includes regions around the vehicle pre-partitioned in directions. For example, the insect blocking region R may include front, rear, left, and right regions around the vehicle. Referring to FIG. 3, the driver may select one of the front, rear, left, and right regions displayed in the blocking region selection unit 23 as the insect blocking region.

Table 2 below shows insect blocking regions, sound output directions, and illumination directions selectable around the vehicle.

TABLE 2

| | Around vehicle | | | |
|---|---|---|---|---|
| Insect blocking region | Front | Rear | Left | Right |
| Sound output direction | Front | Rear | Left | Right |
| Illumination direction | Rear | Front | Right | Left |

In Table 2 above, the front, rear, left, and right regions are regions pre-partitioned around the vehicle in directions. In Table 2, the insect blocking region may be a region at which the user is located, among the regions around the vehicle. That is, the user selects the region at which the user is located from among the front, rear, left, and right regions as an insect blocking region for insect repelling.

In the present disclosure, when the user selects the insect blocking region, sound having a frequency that insects avoid and light for enticing insects are output to the insect blocking region selected by the user, whereby insects are repelled from the selected insect blocking region.

In Table 2, the sound output directions refer to the directions and regions in which the speakers 52 to 55 mounted to the vehicle output sounds, and the illumination directions refer to the directions and regions in which the lamps 61 to 64 mounted to the vehicle emit light. The sound output directions also refer to the positions of the speakers 52 to 55 that output sound, and the illumination directions also refer to the positions of the lamps 61 to 64 that emit light.

In Table 2, that the sound output direction is the "front" means that a front speaker 52 mounted to the vehicle to output sound forwards is used, and insect repelling sound is output through the front speaker 52. In the same manner, that the sound output direction is the "rear" means that a rear speaker 53 mounted to the vehicle to output sound rearwards is used, that the sound output direction is the "left" means that a left speaker 54 mounted to the vehicle to output sound leftwards is used, that the sound output direction is the "right" means that a right speaker 55 mounted to the vehicle to output sound rightwards is used, and insect repelling sound is output through each of the rear speaker 53, the left speaker 54, and the right speaker 55.

Also, in Table 2, that the illumination direction is the "front" means that a front lamp 61 mounted to the vehicle to emit light forwards is used, and insect enticement light is emitted from the front lamp 61. In the same manner, that the illumination direction is the "rear" means that a rear lamp 62 mounted to the vehicle to emit light rearwards is used, that the illumination direction is the "left" means that a left lamp 63 mounted to the vehicle to emit light leftwards is used, that the illumination direction is the "right" means that a right lamp 64 mounted to the vehicle to emit light rightwards is used, and insect enticement light is emitted from each of the rear lamp 62, the left lamp 63, and the right lamp 64.

When the driver selects a desired insect blocking region R through the blocking region selection unit 23 disposed on one side of the screen of the display 21 by touch, as shown in FIG. 3, the controller recognizes the same. At this time, when one of the front, rear, left, and right regions is selected by the user in the blocking region selection unit 23, the controller 40 determines the sound output direction and the illumination direction, as shown in Table 2, and controls operation of the sound generation device 50 and the illumination device 60 based on the determined sound output direction and the determined illumination direction.

When the user selects the insect blocking region R, the sound output direction is determined to be a direction identical to the direction of the inset blocking region, and the illumination direction is determined to be a direction opposite to the direction of the inset blocking region, as can be seen from Table 2. For example, when the insect blocking region is selected to the "front," insect repelling sound is output to the front region around the vehicle through the front speaker 52, and insect enticement light is emitted from the rear lamp 62 to illuminate the rear region around the vehicle. Consequently, insects are repelled from the front region around the vehicle at which the user is located by the insect repelling sound, and insects gather at the rear region around the vehicle, which is a region opposite the region at which the user is located, due to the insect enticement light emitted to the rear of the vehicle.

Figure 4:
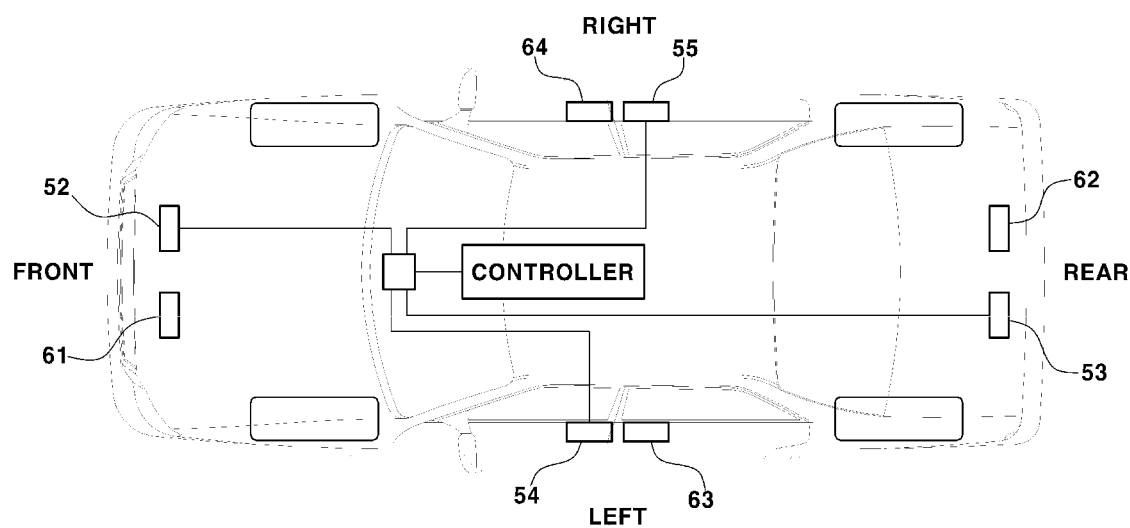
FIG. 4 is a view illustrating a lamp operation state for insect enticement in the insect repelling system according to the embodiment of the present disclosure.

FIG. 4 is a view illustrating a sound output state of the speakers 52 to 55 for insect repelling (insect blocking) and a lighting state of the lamps 61 to 64 for insect enticement in the insect repelling system according to the embodiment of the present disclosure. FIG. 4 shows an example in which the insect blocking region is set to the left region around the vehicle by the user.

In the case in which the user is located in the left region around the vehicle, the user may set the left region around the vehicle to the insect blocking region through the interface unit 20. At this time, insect repelling sound having the frequency selected by the controller 40 is output from the left speaker 54 installed at the left side of the vehicle. In addition, the right lamp 64 installed at the right side of the vehicle is turned on by the controller 40 to illuminate the right region around the vehicle, whereby insects are enticed to the right region around the vehicle by light emitted from the right lamp 64. As a result, most insects move to the right region around the vehicle, and therefore no insects gather at the left region around the vehicle at which the user is located.

In the present disclosure, most insects that are blocked by outputting sound having predetermined frequencies through the speakers 52 to 55 may be mosquitoes. In addition, most insects that gather at the side opposite the side at which the user is located by illumination of the lamps 61 to 64 may be moths.

Meanwhile, the state information provision unit 30 of the insect repelling system according to the embodiment of the present disclosure is configured to provide vehicle state information to the controller 40. Here, the vehicle state information may include the gear stage of the vehicle and the state of charge (SOC) of a battery. In this case, the state information provision unit 30 may include a gear stage detection unit configured to detect the current gear stage position of the vehicle and a battery management system (BMS) configured to provide information about the state of charge (SOC) of the battery. In addition, the vehicle state information may include vehicle speed. In this case, the state information provision unit 30 may include a vehicle speed detection unit. Of course, the vehicle state information may include both the gear stage information and the vehicle speed information, and the state information provision unit 30 may include both the gear stage detection unit and the vehicle speed detection unit.

The controller 40 outputs a control signal for controlling sound output and illumination for insect repelling based on the vehicle position information, the vehicle state information, and the user selection information. At this time, the controller 40 acquires information about insects that mainly inhabit the region corresponding to the current position of the vehicle and information about frequencies that the insects avoid from the current position information of the vehicle based on internal data, and displays the acquired insect information and frequency information through the display 21 of the interface unit 20.

In addition, when a desired frequency is selected by the user, the controller 40 performs control such that the sound generation device 50 outputs sound having the selected frequency. At this time, the controller 40 determines the insect blocking region selected by the user from the user selection information input through the interface unit 20, and performs control such that the sound generation device 50 outputs sound having the selected frequency to the determined insect blocking region. In addition, the controller 40 performs control such that the illumination device 60 illuminates the region opposite the determined insect blocking region.

After description of the sound generation device 50 and the illumination device 60, the controller 40 will be further described.

In the embodiment of the present disclosure, the sound generation device 50 includes a sound source (not shown) configured to pre-store a plurality of insect repelling sounds having different frequencies and to provide an insect repelling sound selected by the controller 40 from among the plurality of stored insect repelling sounds, an amplifier 51 configured to amplify an insect repelling sound provided by the sound source and to transmit the amplified insect repelling sound to a speaker selected by the controller 40, and a plurality of speakers 52 to 55 configured to receive a sound signal amplified by the amplifier 51 and to output the received sound signal as an insect repelling sound.

In the embodiment of the present disclosure, the speakers 52 to 55 may be speakers of the VESS, as previously described. Specifically, a plurality of speakers 52 to 55 configured to output sounds to the front, rear, left, and right of the vehicle may be included. In this case, the speakers 52 to 55 may be speakers mounted to the front part, rear part, left part, and right part of the vehicle.

In the embodiment of the present disclosure, the illumination device 60 may include a plurality of lamps 61 to 64 mounted to the vehicle. Specifically, the illumination device 60 may include a plurality of lamps 61 to 64 configured to emit light to the front, rear, left, and the right of the vehicle for illumination. In this case, the lamps 61 to 64 may be lamps mounted to the front part, rear part, left part, and right part of the vehicle, and the lamp 61 mounted to the front part of the vehicle may be a headlamp.

In the embodiment of the present disclosure, the controller 40 performs control such that the species of insects that can be repelled and the frequency ranges are displayed on the display 21 of the interface unit 20 based on the current position information of the vehicle acquired by the position information acquisition unit 10, and determines insect repelling sound based on the user selection information input by the user through the interface unit 20.

In addition, the controller 40 determines a sound output region and an illumination region based on the insect blocking region R selected through the blocking region selection unit 23 of the display 21, among the user selection information input by the user through the interface unit 20. That is, one of the speakers 52 to 55 from which sound is output and one of the lamps 61 to 64 from which insect enticement light is emitted are determined.

The construction of the insect repelling system according to the embodiment of the present disclosure has been described in detail above. Hereinafter, the operation of the insect repelling system will be described with reference to FIG. 5.

First, the controller 40 checks whether the vehicle is in a stop state. That is, the controller 40 checks whether the current gear stage position is a parking stage (P stage) from the gear stage information, among the vehicle state information acquired by the state information acquisition unit 30 (S11). In the case in which the current gear stage position is the parking stage (P stage), the controller 40 may determine that the vehicle is currently in the stop state.

In the embodiment of the present disclosure, the controller 40 may use vehicle speed information, among the vehicle state information acquired by the state information acquisition unit 30, in order to check the stop state of the vehicle. In the case in which the current vehicle speed is 0 km/h, which is a stop speed, the controller 40 may determine that the vehicle is in the stop state.

Subsequently, when the driver turns on an insect blocking mode through the interface unit 20, the controller 40 checks whether the insect blocking mode is turned on (S12), and displays information about species of insects that can be repelled at the current position of the vehicle, main inhabitation places, and frequency ranges suitable for insect repelling through the display 21 of the interface unit 20 based on the vehicle position information acquired by the position information acquisition unit 10 for recommendation to the user (S13).

For example, as shown in FIG. 3, the controller 40 performs control such that information about species of mosquitoes that can be repelled at the current position of the vehicle and frequency ranges that the mosquitoes avoid is displayed in the frequency selection unit 22 of the display 21. In addition, the controller 40 performs control such that main inhabitation places (city, beach, and mountain/field) are also displayed in order for the user to easily select an appropriate frequency range with reference to the region at which the user and the vehicle are located.

Subsequently, the user finally selects one of the species of insects and the frequency ranges displayed in the frequency selection unit 22 of the display 21 (S14). For example, as shown in FIG. 3, the user may finally determine, select, and input the species of the mosquito and the frequency range corresponding to the region (city, beach, or mountain/field) at which the user is currently located, among the species of insects and the frequency ranges displayed in the frequency selection unit 22 of the display 21.

In addition, the user selects and inputs the region at which the insect blocking mode is to be activated, i.e. the insect blocking region R, among several regions around the vehicle displayed in the blocking region selection unit 23 of the display 21 of the interface unit 20.

When the user finally selects the insect blocking region R, the controller 40 controls operation of the sound generation device 50 and the illumination device 60 (S15). That is, sound having the selected frequency is output to the insect blocking region R through the speakers 52 to 55, whereby insects in the insect blocking region escape the insect blocking region in order to avoid the frequency.

In addition, the controller 40 turns on the lamps 61 to 64 at the region opposite to the insect blocking region R selected by the user such that insect enticement light is emitted to the region opposite to the insect blocking region R from the lamps 61 to 64 (see FIG. 4). As described above, the region opposite to the insect blocking region R is illuminated, whereby insects, such as moths, gather at the region, and therefore no insects gather at the insect blocking region at which the user is located.

In the insect repelling system according to the embodiment of the present disclosure, as described above, it is possible to provide an insect blocking effect of preventing insects from entering a specific region around the vehicle using the speakers 52 to 55 and the lamps 61 to 64 mounted to the vehicle during night or outdoor activities, such as camping.

In particular, for an electrified vehicle, sound having frequencies that insects dislike may be output through speakers 52 to 55 of a VESS, whereby it is possible to block insects without installation of new speakers. Also, in the present disclosure, it is possible for the user to arbitrarily select a desired insect blocking region on the display 21.

As is apparent from the foregoing, in the insect repelling system according to the embodiment of the present disclosure, sound having frequencies that insects avoid is output using the speakers installed at the vehicle, whereby it is possible to safety repel harmful insects, such as mosquitoes or moths, gathering around the vehicle without using any chemical insecticide. In particular, it is possible to effectively repel harmful insects using a person's own vehicle during night or outdoor activities, such as camping, whereby it is possible to prevent discomfort or injuries due to harmful insects.

It will be apparent to a person of ordinary skill in the art that the present disclosure described above is not limited to the above embodiments and the accompanying drawings and that various substitutions, modifications, and variations can be made without departing from the technical idea of the present disclosure.

What is claimed is:

1. An insect repelling system using a vehicle, the insect repelling system comprising:
    a position information acquisition unit configured to acquire and provide vehicle position information;
    an interface unit configured to display species-based frequency ranges that insects avoid and to allow a user to select one of the displayed frequency ranges;
    a controller configured to perform control such that the interface unit displays the species-based frequency ranges for repelling insects at a current position of the vehicle based on the vehicle position information acquired by the position information acquisition unit and to generate and output a control signal for outputting a sound having the frequency selected through the interface unit; and
    a sound generation device configured to output the sound having the frequency selected by the user to an external space around the vehicle according to the control signal output by the controller.

2. The insect repelling system according to claim 1, further comprising an illumination device configured to illuminate a region selected by the user, which is a portion of the external space around the vehicle, according to the control signal output by the controller in order to entice insects.

3. The insect repelling system according to claim 2, wherein:
    the external space around the vehicle comprises front, rear, left, and right regions around the vehicle, and
    the illumination device comprises lamps mounted to the vehicle to selectively emit light to the front, rear, left, and right regions.

4. The insect repelling system according to claim 1, wherein:
    the interface unit is configured to display a plurality of regions of the external space around the vehicle and to allow the user to select one of the plurality of displayed regions as an insect blocking region, and
    the controller generates and outputs the control signal for outputting the sound having the selected frequency to the insect blocking region selected through the interface unit.

5. The insect repelling system according to claim 4, further comprising an illumination device configured to illuminate another region selected by the user, among the plurality of regions, according to the control signal output by the controller in order to entice insects.

6. The insect repelling system according to claim 5, wherein:
    the plurality of regions comprises front, rear, left, and right regions around the vehicle, and
    the illumination device comprises lamps mounted to the vehicle so as to selectively emit light to the front, rear, left, and right regions.

7. The insect repelling system according to claim 5, wherein the other selected region illuminated by the illumination device is opposite the insect blocking region selected by the user among the plurality of regions displayed in the interface unit.

8. The insect repelling system according to claim 4, wherein the sound generation device comprises speakers mounted to the vehicle so as to output sounds to the plurality of regions defined by partitioning the external space around the vehicle.

9. The insect repelling system according to claim 8, wherein:
    the sound generation device is a virtual engine sound system, and
    the speakers are speakers of the virtual engine sound system.

10. The insect repelling system according to claim 8, wherein:
    the plurality of regions comprises front, rear, left, and right regions around the vehicle, and
    the sound generation device comprises speakers mounted to the vehicle so as to selectively output sounds to the front, rear, left, and right regions.

11. The insect repelling system according to claim 1, wherein the interface unit is configured to further display information about species-based main inhabitation places of insects to allow the user to select an insect and a frequency range set for a main inhabitation place corresponding to a place at which the user is located.

12. The insect repelling system according to claim 1, further comprising:
    a state information provision unit configured to provide vehicle state information to the controller,
    wherein upon determining from the vehicle state information provided by the state information provision unit that the vehicle is in a stop state, the controller displays the frequency ranges through the interface unit and performs control for outputting the sound.

13. The insect repelling system according to claim 12, wherein upon determining that the user turns on an insect blocking mode through the interface unit after determining that the vehicle is in the stop state, the controller displays the frequency ranges through the interface unit and performs control for outputting the sound.

14. The insect repelling system according to claim 12, wherein the state information provision unit comprises at least one of a gear stage detection unit configured to detect a gear stage of the vehicle or a vehicle speed detection unit configured to detect a vehicle speed.

* * * * *